(12) United States Patent
Baumgartner et al.

(10) Patent No.: US 9,678,853 B2
(45) Date of Patent: Jun. 13, 2017

(54) LIFTING OF BOUNDED LIVENESS COUNTEREXAMPLES TO CONCRETE LIVENESS COUNTEREXAMPLES

(71) Applicant: International Business Machines Corporation, Armonk, NY (US)

(72) Inventors: Jason R. Baumgartner, Austin, TX (US); Raj Kumar Gajavelly, Warangal (IN); Alexander Ivrii, Haifa (IL); Pradeep Kumar Nalla, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/862,784

(22) Filed: Sep. 23, 2015

(65) Prior Publication Data

US 2017/0010950 A1   Jan. 12, 2017

Related U.S. Application Data

(63) Continuation of application No. 14/792,964, filed on Jul. 7, 2015.

(51) Int. Cl.
| | | |
|---|---|---|
| *G06F 11/00* | (2006.01) | |
| *G06F 11/34* | (2006.01) | |
| *G06F 11/30* | (2006.01) | |

(52) U.S. Cl.
CPC ...... *G06F 11/3495* (2013.01); *G06F 11/3003* (2013.01); *G06F 11/3461* (2013.01)

(58) Field of Classification Search
USPC .................................................. 714/37, 45
See application file for complete search history.

(56) References Cited

U.S. PATENT DOCUMENTS

| | | |
|---|---|---|
| 6,957,404 B2 | 10/2005 | Geist et al. |
| 7,661,082 B1 | 2/2010 | McMillan et al. |
| 8,302,044 B2 | 10/2012 | Moon et al. |
| 8,381,148 B1 | 2/2013 | Loh et al. |

(Continued)

OTHER PUBLICATIONS

Aleksandrowicz et al., "Generalized Counterexamples to Liveness Properties", Formal Methods in Computer-Aided Design (2013), pp. 169-172, ISBN 978-0-9835678-3-7/13, Copyright owned jointly by the authors and FMCAD Inc.

(Continued)

*Primary Examiner* — Sarai Butler
(74) *Attorney, Agent, or Firm* — Maeve M. Carpenter; Daniel R. Simek

(57) ABSTRACT

A trace of a bounded liveness failure of a system component is received, by one or more processors, along with fairness constraints and liveness assertion conditions. One or more processors generate randomized values for unassigned input values and register values, of the trace, and simulate traversal of each of a sequence of states of the trace. One or more processors determine whether traversing the sequence of states of the trace results in a repetition of a state, and responsive to determining that traversing the sequence of states of the trace does result in a repetition of a state, and the set of fairness constraints are asserted within the repetition of a state, and that the continuous liveness assertion conditions are maintained throughout the repetition of the state, a concrete counterexample of a liveness property of the system component is reported.

9 Claims, 7 Drawing Sheets

(56) References Cited

U.S. PATENT DOCUMENTS

| | | |
|---|---|---|
| 8,639,490 B2 | 1/2014 | Chockler et al. |
| 2006/0200039 A1 | 9/2006 | Brockway et al. |
| 2007/0168730 A1* | 7/2007 | Memmi ............... G06F 17/5022 714/30 |
| 2007/0277057 A1* | 11/2007 | Braun ................. G06F 11/2273 714/44 |
| 2010/0281309 A1* | 11/2010 | Laurenti ............. G06F 11/3013 714/45 |
| 2013/0151896 A1* | 6/2013 | Inagaki ................ G06F 11/263 714/25 |

OTHER PUBLICATIONS

Alpern et al., "Defining Liveness*", *This work was supported, in part, by NSF Grant DCR-8320274. F. B. Schneider was also supported by an IBM Faculty Development Award, Information Processing Letters 21 (1985), Oct. 7, 1985, pp. 181-185, North-Holland, 0020-0190/85, © 1985, Elsevier Science Publishers B. V. (North-Holland).

Alpern et al., "Recognizing safety and liveness*", *This work is supported, in part, by NSF Grant DCR-8320274 and Office of Naval Research contract N00014-86-K-0092, Distributed Computing (1987) 2:117-126, © Springer-Verlag 1987.

Biere et al., "Liveness Checking as Safety Checking", Electronic Notes in Theoretical Computer Science 66 No. 2 (2002), pp. 160-177, © 2002 Published by Elsevier Science B. V., <http://www.elsevier.nl/locate/entcs/volume66.html>.

Claessen et al., "A Liveness Checking Algorithm that Counts", Proceedings of the 12th Conference on Formal Methods in Computer-Aided Design (FMCAD 2012), pp. 52-59, 978-0-9835678-2-0/12, © 2012 FMCAD Inc.

Mastroeni et al., "An Abstract Interpretation-based Model for Safety Semantics", International Journal of Computer Mathematics, vol. 88, No. 4, Mar. 2011, pp. 1-29, ISSN 1029-0265 online, DOI: 10.1080/0020716YYxxxxxxxx, <http://www.informaworld.com>.

Ravi et al., "A Comparative Study of Symbolic Algorithms for the Computation of Fair Cycles*", * This work was supported in part by SRC contract 98-DJ-620 and NSF grant CCR-99-71195, FMCAD 2000, LNCS 1954, pp. 143-160, 2000, © Springer-Verlag Berlin Heidelberg 2000.

Schuppan, Viktor, "Liveness Checking as Safety Checking to Find Shortest Counterexamples to Linear Time Properties", Doctoral Thesis ETH No. 16268, A dissertation submitted to the Swiss Federal institute of Technology Zurich for the degree of Doctor of Technical Sciences, pp. V-151, 2005, © Viktor Schuppan.

Zhu et al., "SAT Sweeping with Local Observability Don't-Cares", DAC 2006, Jul. 24-28, 2006, San Francisco, California, USA, pp. 1-6, Copyright 2006 ACM 1-59593-381-6/06/0007.

U.S. Appl. No. 14/792,964, filed Jul. 7, 2015—not attached, readily available to Examiner.

List of IBM Patents or Patent Applications Treated as Related (Appendix P), filed herewith.

List of IBM Patents or Patent Applications Treated as Related, Appendix P, Filed Herewith, 2 pages.

Baumgartner, et al., U.S. Appl. No. 141792,964, filed.

* cited by examiner

LIFTING OF BOUNDED LIVENESS COUNTEREXAMPLES TO CONCRETE LIVENESS COUNTEREXAMPLES

BACKGROUND OF THE INVENTION

The present invention relates generally to the field of hardware and software function verification, and more particularly to determining concrete counterexamples of liveness properties.

Regarding the verification of system hardware and software components, two types of properties are prevalent. One property is referred to as a safety property, and the other is referred to as a liveness property. A safety property asserts that during operation of the hardware or software component, something bad should never happen. In LTL (Linear Time Temporal Logic) safety properties are often expressed in the form: G (!P), which may be expressed as, (globally), "it is always the case that P never happens", for some combinational or bounded temporal condition P. This is illustrated by considering an equivalence checking problem in which an optimized design is checked against a reference model. The outputs of both the optimized and reference instances should always be equal, therefore P would express the bitwise inequality of these two designs, and it would be expected that the inequality would never happen G (!P).

A liveness property asserts that "something good eventually must happen". In LTL, such properties can be expressed in form: GF (P), which may be expressed as, "it is always the case that sometime in the future, P occurs". To illustrate this, in case of an arbiter verification, every request should eventually be acknowledged, for example, granting the request. Liveness verification often involves fairness constraints, which confirm the validity of a failure by enforcing certain conditions to hold. For example, a system with various priorities associated with requests may need to enforce that higher-priority requests eventually allow the system to grant lower-priority requests, without which liveness checking of lower-priority requests would fail. The eventual granting of lower-priority requests of the example is a fairness condition enforced in a liveness property verification. Safety properties typically contain a finite length counterexample illustrating a failure condition. Whereas for liveness properties, counterexamples are typically infinite in length. Liveness verification is very crucial for systems such as arbiters, which typically restrict access to shared resources in the microprocessors.

SUMMARY

According to one embodiment of the present invention, a method is provided for mapping a bounded liveness failure to a concrete counterexample of a liveness property of a system component. The method includes one or more processors that receive a trace of a bounded liveness failure of a system component, a set of fairness constraints and continuous liveness assertion conditions corresponding to the trace. One or more processors generate randomized values for one or more unassigned input values of one or more registers of the trace and for unassigned register values of the one or more registers of the trace. One or more processors simulate traversal of each state of a sequence of states of the trace. One or more processors determine whether traversing the sequence of states of the trace results in a repetition of a state of the sequence of states of the trace, and responsive to determining that traversing the sequence of states of the trace does result in a repetition of a state of the sequence of states of the trace, and determining that the set of fairness constraints are asserted within the sequence of states leading to the repetition of a state of the sequence of states, and that the continuous liveness assertion conditions are maintained throughout the sequence of states leading to the repetition of the state of the sequence of states, one or more processors report a concrete counterexample of a liveness property of the system component.

DETAILED DESCRIPTION

Embodiments of the present invention recognize that hardware and software components of systems include liveness properties that may require verification. Verification of liveness properties includes determining whether an instance of a valid counterexample exists, indicating the failure of the liveness property for a particular system component. A liveness property counterexample includes an infinite length path in which an action or condition that is asserted does not occur. Examples of liveness properties include starvation freedom, termination, and guaranteed service. Starvation freedom states that a process makes progress infinitely often, termination asserts that a program does not run forever, executing a final instruction at some point, and guaranteed service states that every request for service is satisfied eventually.

Embodiments of the present invention provide a method, computer program product, and computer system that maps a bounded liveness failure of a system component to a concrete failure, based on a liveness check simulation. Some embodiments of the present invention include mapping a bounded liveness failure of a system component to a concrete failure, based on bounded model checking. Other embodiments include mapping a bounded liveness failure of a system component to a concrete failure, based on unbounded model checking. And still other embodiments of the present invention include mapping a bounded liveness failure of a system component to a concrete failure based upon a BDD (Binary Decision Diagram)-based liveness verification.

Figure 1:
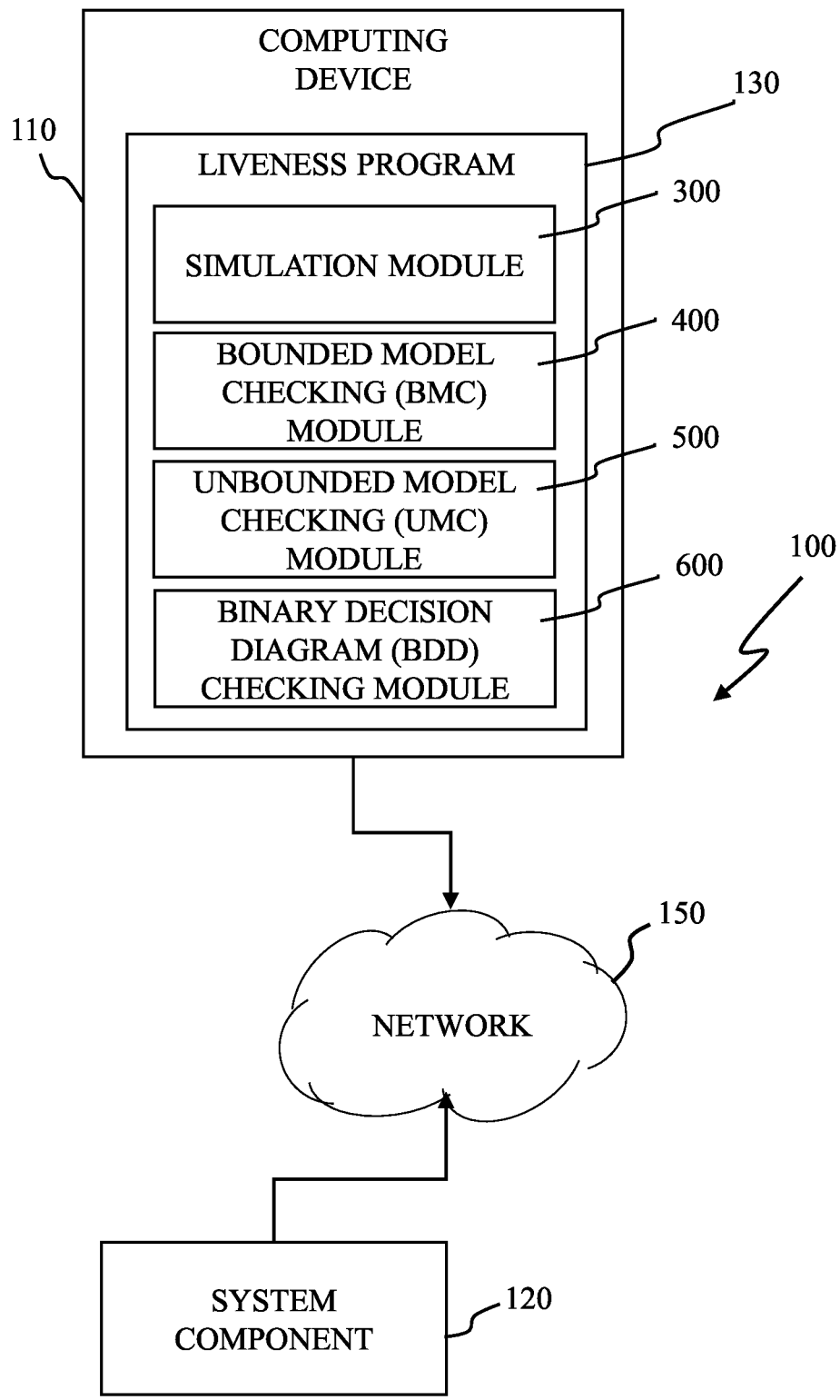
FIG. 1 is a functional block diagram illustrating a distributed verification processing environment, in accordance with an embodiment of the present invention.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 is a functional block diagram illustrating distributed verification processing environment 100, in accordance with an embodiment of the present invention. Distributed verification processing environment 100 includes computing device 110, system component 120, liveness program 130, which includes liveness verification modules, all interconnected via network 150. The modules of liveness program 130 include simulation module 300, bounded model checking (BMC) module 400, unbounded model checking (UMC) module 500, and binary decision diagram (BDD) checking module 600.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between computing device 110, liveness program 130, and simulation module 300, BMC module 400, UMC module 500, and BDD checking module 600, in accordance with embodiments of the present invention.

Computing device 110 is a computing device that includes liveness program 130, and is capable of operating liveness program 130 and the component modules of liveness program 130, within distributed verification processing environment 100. In some embodiments computing device 110 may be a management server, a web server, a mobile computing device, or any other electronic device or computing system capable of receiving and sending data. In other embodiments, computing device 110 may represent a virtual computing device of a computing system utilizing multiple computers as a server system, such as in a cloud computing environment. In another embodiment, computing device 110 may be a laptop computer, a tablet computer, a netbook computer, a personal computer (PC), a desktop computer, a personal digital assistant (PDA), a smart phone, or any programmable electronic device capable of performing the operational steps of liveness program 130 and modules 300, 400, 500, and 600, via network 150. In another embodiment, computing device 110 represents a computing system utilizing clustered computers and components (e.g., database server computers, application server computers, etc.) that act as a single pool of seamless resources when accessed within distributed verification processing environment 100. Computing device 110 may include internal and external hardware components, as depicted and described with reference to FIG. 7.

Liveness program 130 includes multiple modules, each of which performs a verification technique that determines and maps a bounded liveness simulated counterexample to a concrete liveness counterexample. In some embodiments of the present invention, liveness program 130 may function as an interface and coordinating control point for access to simulation module 300, BMC module 400, UMC module 500, and BDD checking module 600. In some embodiments of the present invention, modules 300, 400, 500, and 600, are included as integrated components of liveness program 130. In other embodiments, modules 300, 400, 500, and 600, may be separate from liveness program 130 and called by liveness program 130 based on received input (not shown).

System component 120 performs one or more functions within a system or device. System component 120 includes multiple gates having associated functions, such as constants, primary inputs, combinational logic, such as "AND" gates, and sequential elements, referred to as registers. Registers have two associated components: their next-state functions, and their initial-value functions. Both are represented as other gates in a finite directed graph, referred to as a netlist, with vertices representing gates, and edges representing interconnections between those gates. Semantically, for a given register, the value appearing at its initial-value gate at time "0" ("initialization" or "reset" time) will be applied as the value of the register itself; the value appearing at its next-state function gate at time "i" will be applied to the register itself at time "i+1". A set of valuations to all registers in a netlist is called a "state". Certain gates are labeled "targets" or "liveness". Targets correlate to safety properties, in which the goal of the verification process is to find a way to drive a "1" to a target, or to prove that no such assertion of the target is possible. In the case of liveness properties, the goal is to demonstrate that the liveness gate may be held at '1' forever (and to generate a "counterexample trace" illustrating this scenario if one is found), or to prove that the liveness gate cannot stay at value 1 forever. In some embodiments of the present invention, system component 120 is a hardware component of a system or device, whereas in other embodiments, system component 120 is a software component of the system or device. Verification of the developer design requirements is performed on system component 120 by one or more of the operational steps of simulation module 300, BMC module 400, UMC module 500, and BDD checking module 600, as part of liveness program 130. Verification of the liveness properties of system component 120 confirms that the designed functions of system component 120 perform as specified, or that a counterexample is determined, indicating a failure of a liveness property of system component 120.

Simulation module 300 performs a simulation on a bounded trace of a liveness gate determined by a failure condition of the liveness gate property, which is converted to a finite safety property verification, referred to as a bounded liveness failure. A netlist is constructed, which is a finite directed graph that represents the liveness gate of the component trace to be verified. Elements of the netlist, referred to as registers, have initial values applied, at timeframe "i". Next-state values of registers are applied to the respective register at a next timeframe "i+1", and so on, representing the states of system component 120 in a time sequence. The set of valuations of the registers in a netlist is referred to as a "state". Simulation module 300 performs a simulation on the bounded liveness trace in which values for signals, which were not relevant for determining the bounded liveness failure, are filled-in randomly. Liveness checking is performed on the trace with filled-in values and relevant values from the bounded liveness failure timeframe intervals for each state of the trace having asserted liveness. For each state of the simulated trace, within each time interval, a check is made to determine if the current state has been previously visited to confirm that fairness constraints have been met, and whether a liveness failing behavior is observed. If the conditions are met, and a failing behavior exists, a valid liveness counterexample (failure of liveness property) is reported.

BMC module 400 recognizes that in populating non-relevant inputs of the trace with randomized values, there is a chance that a concrete counterexample may be missed due to filling in values that do not contribute to a state repetition, or due to the remaining unnecessary input assignments from the bounded safety verification check. To address these possibilities, BMC module 400 is applied in cases in which the simulation is unable to map a simulation counterexample to a concrete counterexample. Following the initial steps of simulation module 300, BMC module 400 performs trace minimization, iteratively replacing an assigned input value with a ternary (unknown) value, followed by re-simulating to determine whether a bounded liveness counterexample results. Having determined the minimized trace, state repetition checks are performed on suspected candidate repetition timeframes. Candidate timeframes are identified by checking compatibility, determined by three-valued states (1—asserted, 0—not asserted, unknown), of variables which have not been removed by minimization. The resulting candidate pairs are checked for state repetition, which may be performed in various ways.

In some embodiments of the present invention, the state repetition check is performed by incrementally, concretely matching one register that is not already part of the candidate mapping, and thereby incrementally making the minimized trace more concrete by an additional equality determination, and by aborting if an equality cannot be achieved. One benefit of this approach is that much less effort may be required to solve a smaller satisfiability instance, if a match cannot be achieved.

In other embodiments, a check for equality of all registers may be performed simultaneously, which may avoid selection of partial equality matches that cannot be extended for later registers. In yet other embodiments, a hybrid state repetition check prioritizes the latches, checking for repetitions among groups of the highest priority unmatched registers incrementally. The latter approach, for easier to handle cases in which no overall repetition exists, performs fewer independent checks, and minimizes risk of poor incremental choices.

Two challenges in applying the alternatives of BMC module 400 include finding the right start time and finding the right end time, to select for loop detection in bounded model checking. The issue of finding the right end time for successful loop detection may be alleviated by using an unbounded model checking approach, such as UMC module 500. A similar extraction of a minimized trace is performed as BMC module 400; however, in contrast to the loop convergence check on the determined candidate positions, UMC module 500 performs safety queries, such as "can a state repetition be reached in response to all liveness failure conditions being satisfied"? If the query is determined to be valid, a concretized loop repetition behavior can be concluded, otherwise, the initial bounded liveness verification is repeated with increased depth.

Prior to directing queries, the states of the bounded liveness check failure are sorted in descending order with respect to the concreteness of each state. Concreteness considers the number of existing Boolean values for the inputs of the gates, with more concrete Boolean values indicating a larger number of state variables assigned, and therefore a greater chance of detecting a state repetition loop. By sorting and performing concretization of minimized traces in this manner, less resources are required, since there are fewer state variables yet to be concretized. Queries are directed to states in which the bounded liveness check failed, corresponding to the abstract counterexample. In the case in which the safety query fails, a loop check can be performed on the non-concretized variables, utilizing help from the newly received failed trace. In response to completely converging on the loop, the particular state in which a state repetition is found is verified to confirm that the particular state can backwardly reach the prefix states. Pre-image computations are used to demonstrate a connection of the particular state to the initial state, concluding a valid liveness failure. Otherwise the process is repeated for the remaining less-concrete states. If the process fails to converge on a state repetition loop, then the process is repeated on the rest of the states in the trace.

UMC module 500 improves the challenge of determining end time selection for loop detection in bounded model checking; however, many options for selecting a start time remain. Each time an unsuccessful start time is chosen, computational resources are effectively wasted. BDD checking module 600, which is based on binary decision diagram (BDD) liveness checking addresses the issue of choosing unsuccessful start times. Similar to BMC module 400, trace minimization is performed, and Boolean values of variables and inputs of the trace constraints are extracted with respect to time. The extracted Boolean values are used for trying to close the loop of the suffix of the failed trace received from simulation module 300.

As such, the extracted constraints are derived only after the bounded liveness counterexample is incrementing its counter, indicating reaching states within the trace suffix. The design is initialized with the start state of the loop suffix, and BDD based liveness verification is performed in a bounded time frame. BDD-based liveness checking often includes two steps. The first step is to perform a reachable state set computation, which is an operation in which passing or failing of complete safety verification is determined. The second step is to analyze the reachable states for fairness-preserving state repetitions. The scope of this check adheres to the suffix information of the extracted constraints to reduce required resources. The two steps can be performed either after the entire set of states that are reached within the duration of the suffix, are enumerated, or incrementally at intermediate intervals. The BDD-based analysis can be performed using forward image computations starting with the first state of the loop suffix state, or backward pre-image computations with the last state of the loop suffix. Basic BDD-based model checking can be used for such purposes; however, embodiments of the present invention include seeding the methodology from a state of a minimized trace, and restricting the reachable state computation to those satisfying the extracted constraints.

Figure 2:
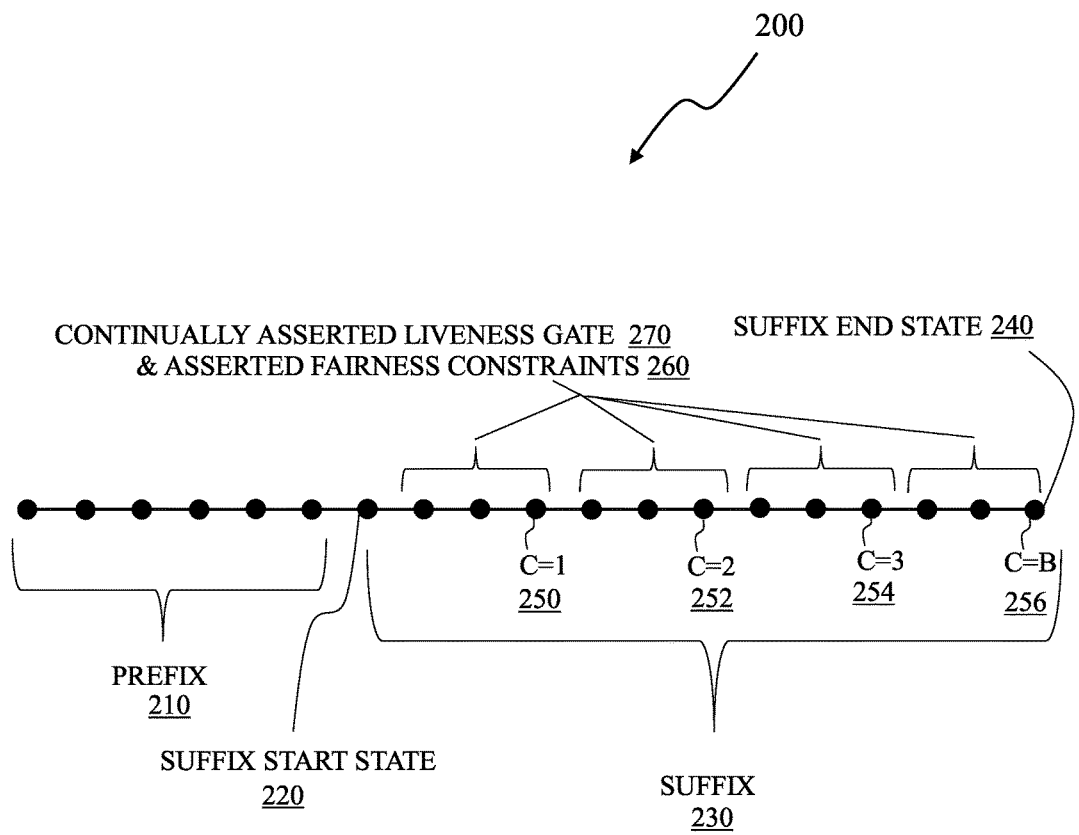
FIG. 2 is an example diagram illustrating a counterexample trace from a bounded liveness failure, in accordance with an embodiment of the present invention.

FIG. 2 is an example illustration of counterexample trace 200 with a netlist format from a bounded liveness failure, in accordance with an embodiment of the present invention. Counterexample trace 200 includes prefix 210, suffix start state 220, suffix 230, suffix end state 240, state repetition counters C1-250, C2-252, C3-254, and CB-256, fairness constraints 260, and continually asserted liveness gate 270. FIG. 2 depicts the behavior of a bounded liveness counterexample having a prefix followed by suffix, where the suffix contains all the conditions required for the bounded liveness failure.

Prefix 210 includes a sequence of states leading to suffix start state 220, which is the starting state conditions of suffix 230. In the case of a true liveness counterexample, suffix 230 includes a series of state repetition counters, each state repetition counter including multiple states in which fairness constraints 260 are checked to insure that all fairness conditions are held during state repetition verification, and continually asserted liveness gate 270 remains asserted during each instance of state repetition counters C1-250, C2-252, C3-254, CB-256. Fairness constraints insure that certain conditions hold, for example, if a request for a resource is made, at some point there is a grant of the request, even if higher priority requests are subsided to eventually grant a lower priority request.

Suffix end state 240 represents the bounded time of the verification (state repetition counter C=Bound-256), and each state repetition counter C1-250, C2-252, C3-254, CB-256, represents a series of time progression of the state of the liveness gate registers, and a determination is made, within the time bound of the verification, if the gate registers return to the state conditions of suffix start state 220. If the state of the liveness gate registers returns to a repetition of suffix start state 220, while continuously asserted liveness gate 270 is performed throughout the bounded time of verification, and fairness constraints 260 are held with the bounded time of verification, then a liveness failure occurs, based on the bounded livenes s-to-safety transformation simulation.

Figure 3:
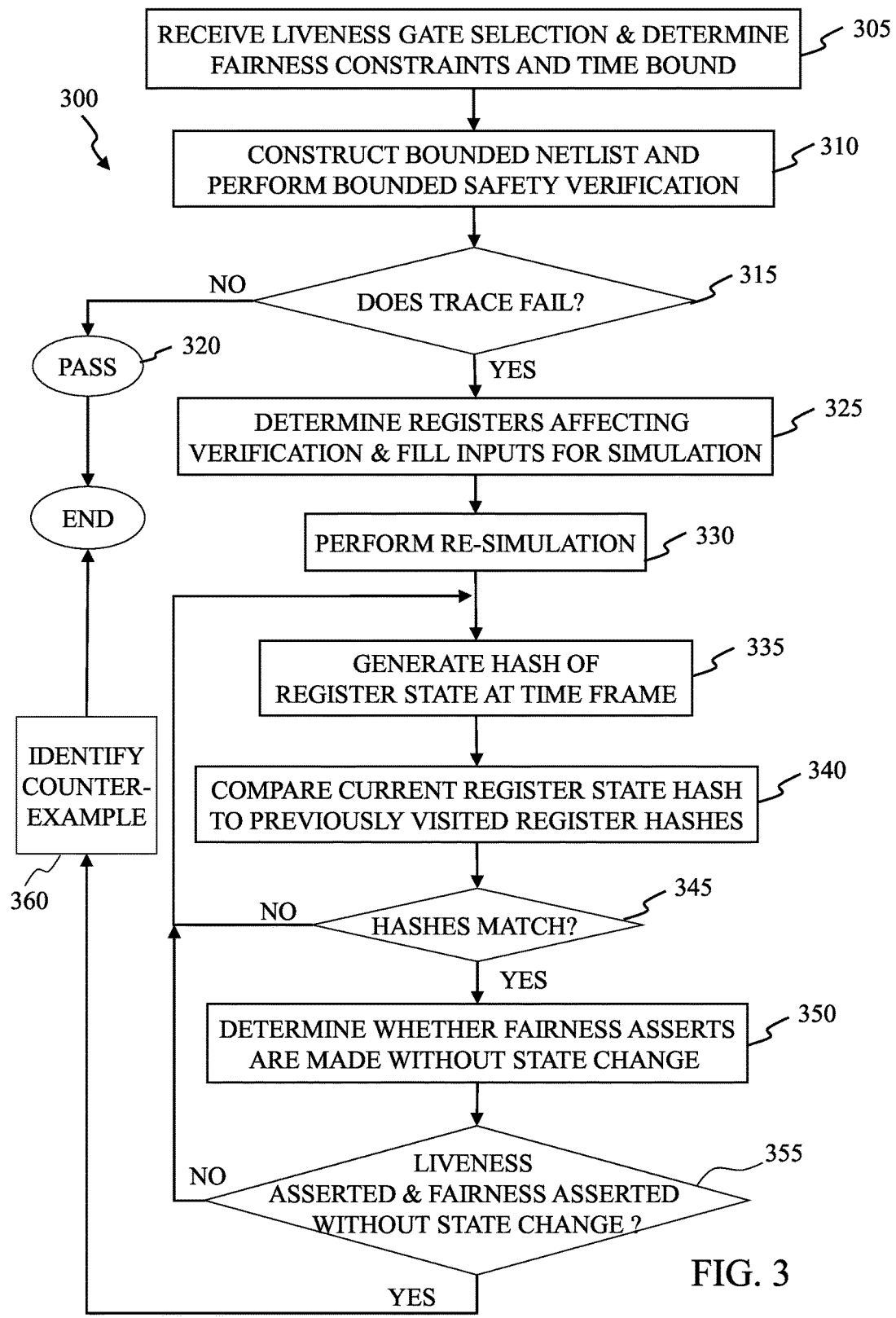
FIG. 3 is a flowchart depicting operational steps of a simulation based bounded liveness convergence checking module, in accordance with an embodiment of the present invention.

FIG. 3 is a flowchart depicting operational steps of simulation module 300, in accordance with an embodiment of the present invention. Simulation module 300 is a simulation based concretization check, using a safety property transformation of a liveness property, for a finite bounded timeframe, or period of time, in which a check for a liveness property failure is performed. The trace for the liveness property failure includes a simulation in which randomized values are filled in for gate signals which were not relevant for the bounded liveness failure. Having included simulated signal values, liveness checking is performed on the trace by analyzing the time intervals of the trace in which the liveness gate remains asserted.

Within each time interval, for each state of the simulated trace, the current state is checked to determine whether the state has been previously visited. In some embodiments of the present invention, to make the determination of whether a state has been previously visited, a hash table is used to collect the hash of the register values at each state of the trace. In this manner, if the hash of the current state matches a hash collected in the hash table, the state is a previously visited state, or also referred to as a repetition of state. Having determined that the state has been previously visited, the loop is checked to determine if the liveness condition exhibited a failing behavior during that loop. This is done by confirming that all fairness constraints have been satisfied (at least once) during the loop, and that the liveness gate is asserted continuously during the loop. If the liveness assertion and fairness constraints are held during traversing of the loop states of the trace, the result is a valid liveness failure associated with the discovered loop suffix; typically a lasso-shaped trace loop. Whenever the liveness gate de-asserts, the hash table is cleared to avoid flagging an inapplicable loop. Simulation module 300 is discussed below in detail.

Simulation module 300 receives a selection of a liveness gate of system component 120, determines fairness constraints, and determines the time bound (step 305). The fairness constraints are the rules by which a failure or counterexample can be concluded to be valid or invalid. The time bound is the amount of time allocated to verify the bounded liveness, and the time bound, fairness constraints, and liveness gate property are inputs used by simulation module 300.

Simulation module 300 constructs a bounded netlist and performs bounded safety verification (step 310). The liveness gate, fairness constraint gates and time bound are used by simulation module 300 to construct the bounded netlist of the liveness gate. The netlist is a flattened form of one or more attributes that contributes to the functionality or intended behavior of a hardware or software design being tested. Simulation module 300 performs the safety property check, using liveness inputs, and results in two outputs: one is the state status, and the other is the trace of the liveness gate that indicated a liveness failure from the bounded liveness verification. Instead of determining a state repetition constituting a true liveness counterexample, a check is made for continuous repetitions of the liveness gate and determining that all fairness gates have been asserted for the specific time bound.

Having acquired inputs, simulation module 300 determines if a trace of a bounded liveness gate fails (decision step 315). If the resulting status is "PASS", meaning that for all requests there is a grant within the time bound (step 315, "NO" branch), the liveness property passes (step 320), and there is no need to pursue verification further for the current liveness gate, and bounded liveness module ends. If the function returns a "FAIL" status (step 315, "YES" branch), then simulation module 300 receives the bounded trace of the liveness gate to be verified and simulation module 300 determines the registers affecting verification, and fills input values of the affecting registers for the simulation (step 325).

Simulation module 300 fills in signal values for inputs that contribute to a failure condition; not necessarily filling in all input conditions, but those conditions contributing to the fail. If there is an input for which there is no value for the trace, a randomized input value is provided. In order to fill in the values for concretization, simulation module 300 performs a re-simulation on the same trace (step 330). During the re-simulation a state repetition check is performed, checking that fairness constraints are asserted and performing a check that the liveness gate is continuously asserted during the bounded time.

In determining the state repetition check, a state is determined for each time interval in which each of the registers in the component design takes on individual values. The values of all registers at a particular time frame corresponds to a state. By determining the state at each time frame of a bounded time range, the states can be compared to check if any states are being repeated. Determining a repetition of state within the time bound, with all the fairness conditions and continuous assertion of the liveness gate, results in a liveness violation, or liveness property failure.

To determine registers states for repetition comparison, simulation module 300 generates a hash of the state of the registers at each time frame of the time bound (step 335). By generating a hash of the registers' state for each time frame as the trace progresses through the loop of the trace, a unique state identification is generated and can be used in efficient comparisons.

Progressing through the time bound of the trace, simulation module 300 compares the current register state hash to previously visited register hashes (step 340). As simulation module 300 reaches each state of the trace, a comparison of the current state hash to previously visited state hashes is performed to determine if there is a match, (decision step 345), and determining that the hashes do not match (step 345, "NO" branch), simulation module 300 continues to progress through the trace and returns to step 360 to generate a hash of the next state within the time bound. For the case in which simulation module 300 determines that the current state hash matches a previously visited state hash (step 345, "YES" branch), simulation module 300 determines whether liveness conditions are continuously asserted and fairness asserts are made without a state change (step 350). Having determined that the state has already been visited, simulation module 300 further determines that the asserted liveness condition has exhibited a failing behavior during the trace loop, and all fairness constraints have been asserted and satisfied during that loop (decision step 355).

If the liveness assertion is not continuous and/or the fairness constraints are not asserted without a state change (step 355, "NO" branch), simulation module 300 returns to step 360 and progresses to the next state of the time bound, until simulation module 300 has revisited all states of the trace and state repetition is not confirmed, and bounded liveness module ends. If the liveness assertion and fairness constraint assertion conditions hold, simulation module 300 determines a valid liveness failure (hit), and identifies a concrete counterexample (step 360), and simulation module 300 ends. Concretization of a counterexample involves filling in the variable and input values for the registers previously available in the trace, if an input value is unavailable, the value is randomize for the input. In embodiments of the present invention, concretization fills in values for all the registers so the liveness property of the trace may be verified.

If the states have repeated while liveness has been asserted and fairness constraints have been held, the result is considered a concrete counterexample. For example, a request for resource is made at suffix start state 220 (FIG. 2), and in performing a re-simulation, simulation module 300 progressing through the states of suffix 230, and generates hashes for the state at each time frame of suffix 230. At state repetition C1-250, the hash of the state matches suffix start state 220, indicating that a loop has completed without a grant of the resource request, while fairness constraints have held, and liveness gates have been continuously asserted. The conditions described indicate a liveness fail.

Figure 4:
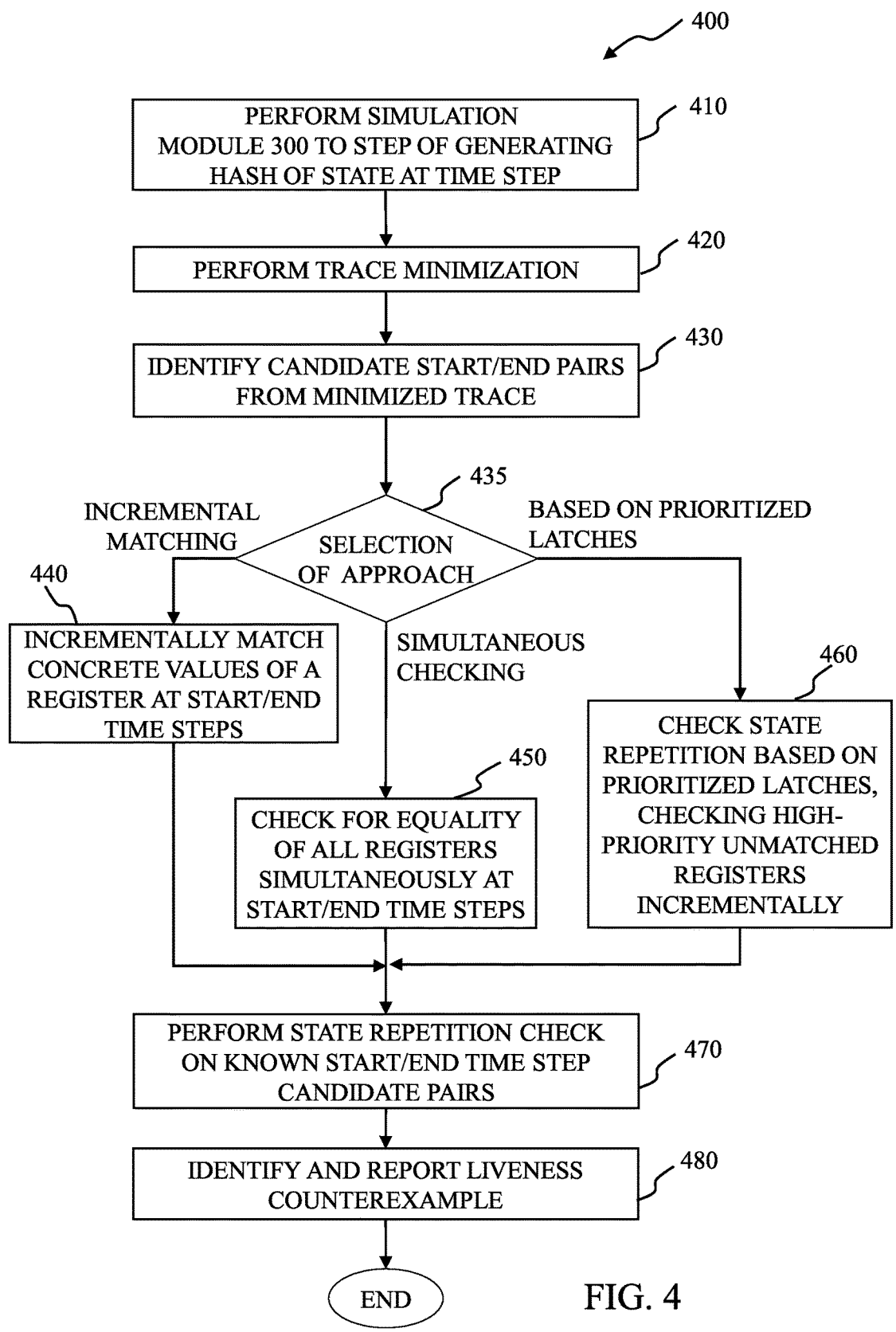
FIG. 4 is a flowchart depicting operational steps of a bounded model checking check module, in accordance with an embodiment of the present invention.

FIG. 4 is a flowchart depicting operational steps of bounded model checking (BMC) module 400, in accordance with an embodiment of the present invention. The liveness check of simulation module 300 is dependent upon the simulation patterns of selected input values, such that a concrete counterexample may be overlooked based on the simulation filling in input values for the register states that do not contribute to a state repetition, or the trace that initially indicated a fail of a bounded liveness safety simulation, had unnecessary assignments which precluded the detection of a state repetition. The result may be that the simulated counterexample is not converged to a concrete counterexample, which can be addressed by applying BMC module 400 to generate a concretization check of liveness.

BMC module 400 performs and completes the operation of simulation module 300 through the step of creating a hash of register values for the state at each time step (time interval) (step 410), and in response to a result that does not converge to a concrete counterexample of liveness, BMC module 400 preforms a trace minimization (step 420). In some embodiments of the present invention, the trace minimization extracts the justifications that are needed to maintain the original bounded liveness failure, such as the fairness assertions with respect to state intervals of the time period, and the continuous liveness assertions throughout the suffix part of the trace. The extraction may be performed using any arbitrary technique for trace minimization, which involves iteratively replacing an assigned input value with a ternary (unknown) value, and re-simulating to determine if the result still constitutes a bounded liveness counterexample. Trace minimization thus iteratively removes concrete Boolean values from the trace that do not impact the resulting liveness counterexample from the simulation.

Having produced a minimized trace, potential candidate time steps (intervals) with state values that have not been minimized away are identified to serve as start and/or end time intervals to check for state variable compatibility. Compatible start/end time intervals exhibit three value states with no incompatible Boolean state variable valuations, in which values of 0, 1, or X, are applied to register inputs to determine compatibility of states (where X represents an input value of "don't care", as it does not affect the resulting liveness counterexample). The compatibility check may be performed in a scalable manner by using a trie data structure, also referred to as a digital tree. The trie data structure holds three-valued states and uses sub-linear space, due to the ability of a trie data structure to share prefix valuations across entries. As each trie node represents a subset of the patterns stored, the candidate check involves linear sweeps of the sub-patterns, traversing child trie nodes of those that are compatible, and avoiding traversing of those which are incompatible. Use of a trie data structure in this manner performs a trie structure compatibility-based minimization. As the compatible state vectors are identified in this process, the time steps associated with the compatible state pairs are used to check for precise state repetition capability.

Determining compatibility of the time period states identifies compatible pairs to serve as candidate time steps of start/end states. A dedicated lookup algorithm may be used to perform state repetition checking, taking into account that all existing trie entries are candidates for a match, except those which differ on 0 and 1 Boolean values alone. BMC module 400 identifies state repetition candidate pairs from the minimized trace (step 430). By minimizing the trace, the candidate time steps used as start and/or end timeframes are known, and state variables that are not removed during trace minimization can be identified as having compatible start/end timeframes by exhibiting compatible three-valued states and no incompatible Boolean state variable valuations. This check may be performed in a scalable manner by using a trie data structure to hold 3-valued states, using sub-linear space due to the ability of a trie to share prefix valuations across entries.

Compatible candidate pairs of states include non-conflicting state values. For example if states A, B, C, and D included three register having valuations of: A={r1=0, r2=1, r3=X}, B={r1=0, r2=0, r3=X}, C={r1=0, r2=X, r3=X}; D={r1=0, r2=1, r3=1}. States A and B are not compatible as they differ in values of registers r1 and r2, whereas states A and C, and A and D are compatible, by virtue of matching values or "don't care" value of X, for registers r1, r2, and r3. As each trie node represents a subset of the patterns stored, the check for candidate compatibility involves linear sweeps of the sub-patterns, traversing child trie nodes for compatible patterns in this manner, and avoiding traversal of those which are incompatible. As the compatible state vectors are identified in this process, the resulting time steps are used to check for precise state repetition capability.

In some embodiments of the present invention, any of three approaches, which make use of the identified candidate pairs, may be selected. If in decision step 435, an incremental matching approach is selected, BMC module 400 incrementally matches concrete values of a register at a start/end time step (alternative step 440). In some embodiments, precise state repetition checks on candidate pairs can be performed by incrementally matching a concrete value to a register not already part of the candidate mapping (i.e., having a Boolean value at both start time and end time), and making the minimized trace more concrete when an additional equality can be achieved, and aborting concrete matching if an equality cannot be achieved. One benefit of this approach is if a match cannot be achieved, it may require much less effort to solve a smaller instance of satisfying conditions contributing to a counterexample.

If in decision step 435 a simultaneous checking approach is selected, BMC module 400 checks for equality of all registers of the candidate pair with unassigned values simultaneously at start/end time steps (alternative step 450). Such a technique has the benefit of avoiding the former check from greedily choosing partial equality matches that cannot be extended for later registers, even if an overall match exists.

If in decision step 435 the approach selection made is based on prioritized latches, BMC module 400 checks state repetition based on prioritized latches, checking high-priority unmatched registers incrementally (alternative step 460). This alternative step is essentially a hybrid approach found to be effective, which establishes priorities among the latches, checking for repetitions among groups of the highest-priority unmatched registers, incrementally. This tends to entail a simpler sub-problem than those that may be encountered with a simultaneous equality check, in the case in which no overall repetition exists. This hybrid alternative entails fewer independent checks and minimizes the risk that the incremental trace building makes an intermediate choice which cannot be repeated even if overall repetition is possible.

Having increased the concreteness of the minimized trace, BMC module 400 performs a state repetition check on known start/end time step state candidate pairs (step 470). A dedicated lookup algorithm may be used when checking for a state repetition, taking into account that all existing trie entries are candidates for a match except those which differ on 0, 1, Boolean values alone.

If repetition of states is determined and fairness constraints are asserted, and liveness conditions are constantly asserted throughout the loop, BMC module 400 identifies and reports a concrete liveness counterexample (step 480), and BMC module 400 ends. In some embodiments of the present invention, if compatible states are not found or if state repetition is not detected, the bound can be increased and the operational steps of BMC module 400 may be repeated (not shown in FIG. 4).

Figure 5:
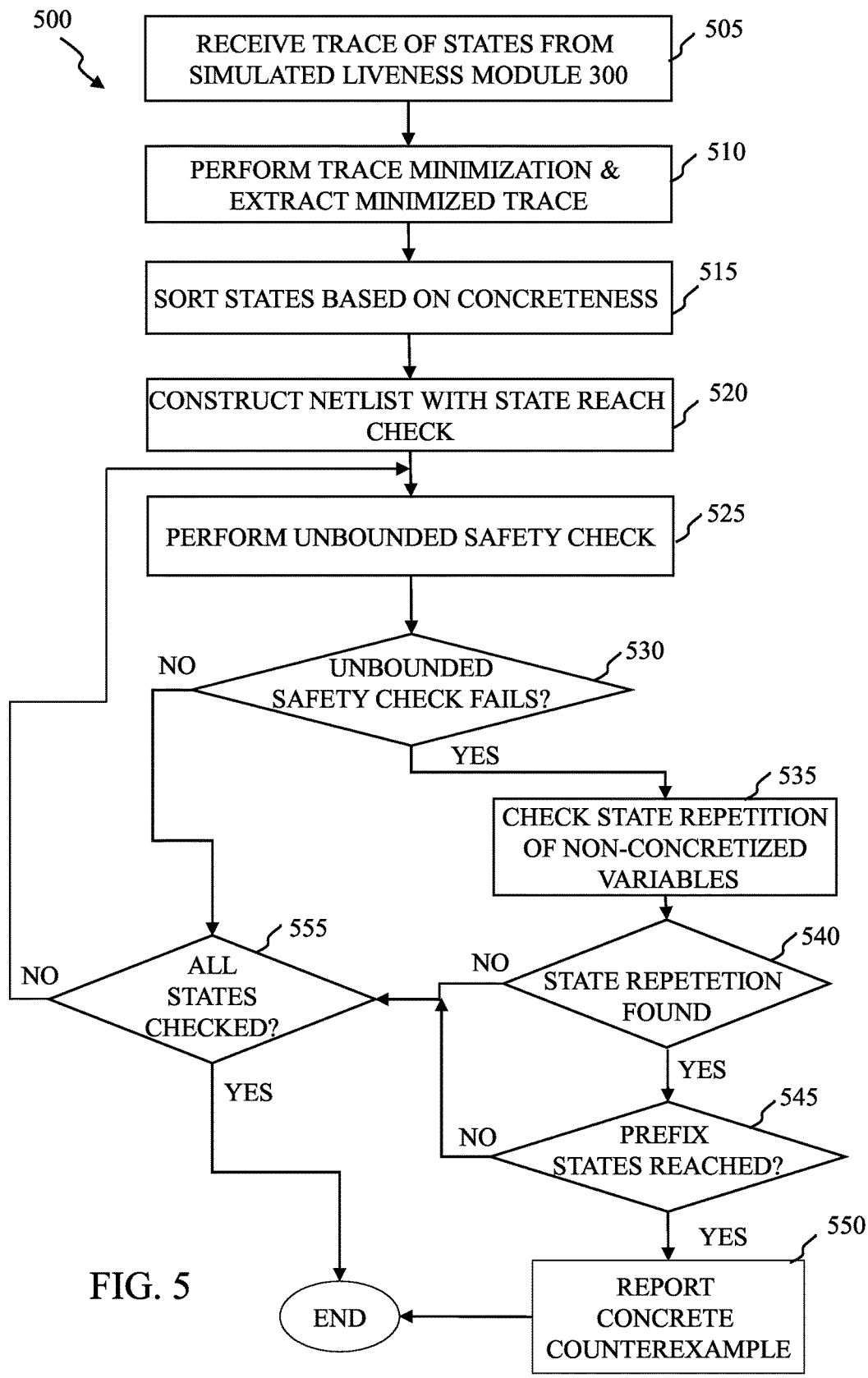
FIG. 5 is a flowchart depicting operational steps of an unbounded model checking module, in accordance with an embodiment of the present invention.

FIG. 5 is a flowchart depicting operational steps of unbounded model checking (UMC) module 400, in accordance with an embodiment of the present invention. Challenges associated with BMC module 400 are finding the effective start and end time steps to select for loop detection that may produce a concrete liveness counterexample. UMC module 500 alleviates the challenge of determining the right end time steps by using an unbounded model checking approach to find any possible end time for a given start time. In contrast to performing the loop convergence check on candidate state positions, without extracting the candidate pairs, based on the concreteness of each state, safety queries are essentially formed and performed, such as a query stating, "can a state repetition be reached after all liveness failure conditions have been satisfied?" If such a query is affirmed, then a behavior of concretized loop repetition (state repetition) can be concluded. Otherwise, the bounded liveness verification is repeated using increased depth. The queries are applied to the states where the bounded liveness check failed. In the case in which the safety query fails, we can also perform the loop check on the non-concretized variables, making use of the received trace from simulation module 300.

Unbounded model checking (UMC) module 500 receives a trace of states at time intervals from simulated liveness module 300 (step 505). Simulation module 300 identifies a trace that indicates a simulated liveness property fail, and provides the trace to UMC module 500.

In response to a result in which simulation module 300 does not converge to a detected loop, UMC module 500 preforms a trace minimization (step 510). The trace minimization extracts the justifications that are needed to maintain the original bounded liveness failure, such as the fairness assertions with respect to the time period, and the continuous liveness assertions in the suffix part of the trace. The extraction may be performed using any arbitrary technique for trace minimization, which involves iteratively replacing an assigned input value with a ternary (unknown) value, and re-simulating to determine if the result still constitutes a bounded (simulated) liveness counterexample. Trace minimization thus iteratively removes concrete Boolean values from the trace that do not impact the liveness trace fail received from the simulation.

UMC module 500 sorts the states based on concreteness (step 515). The states are sorted (in descending order) with respect to their concreteness, such that the states having more concrete Boolean values (1, 0), indicate a larger quantity of state variables assigned, and have a greater opportunity for detecting a state repetition loop. The detection requires fewer computational resources, because there are fewer state variables to concretize.

Having sorted the states based on concreteness, UMC module 500 constructs a netlist with a state reach check (step 520). UMC module 500 constructs a netlist that includes a check to determine the reachable states from each of the states. For example, the netlist may be represented as a directed graph with each state represented as a node of the graph and interconnected to other reachable nodes by edges. UMC module 500 performs an unbounded safety check (step 525). The unbounded safety check simulates a liveness property check and determines if a state repetition occurs within the suffix of the minimized trace. A state repetition indicates a failure condition of the unbounded safety check.

UMC module 500 determines if the unbounded safety check fails (decisions step 530), and determining that the unbounded safety check does not fail (step 530, "NO" branch), UMC module 500 proceeds to determine if all states and variables of states have been checked (decision step 555), and determining that states and variables remain to be included in performing an unbounded safety check (step 555, "NO" branch), UMC module 500 proceeds to step 525 and includes non-concretized variables to perform an unbounded safety check, and proceeds as described above. For the case in which all states and non-concretized state variables have been checked by including an unbounded safety check (step 555, "YES" branch), and determining no failure, UMC module 500 ends.

In the case in which UMC module 500 determines a failure condition of an unbounded safety check (step 530, "YES" branch), UMC module 500 checks for state repetition by including non-concretized variables (step 535). Non-concretized variables lack definitive Boolean values and therefore allow more compatible states with which to identify a state repetition loop. For example, register values and input values for the minimized trace for a particular time interval state may have multiple "don't care" values, and thus may result in increased compatibility with other states of the minimized trace. The increase of compatibility may improve the possibility of identifying a state repetition loop.

Having included non-concretized variables, UMC module 500 determines whether a state repetition is found (decision step 540), and determining that a state repetition is found, (step 540, "YES" branch), UMC module 500 determines whether a prefix state can be reached from the state repetition state (decision step 545). Prefix states are reachable if the concrete state indicating state repetition is connected to the initial state of the trace suffix. UMC module 500 determines whether the initial state of the trace suffix is reachable from the state repetition loop.

Determining that a prefix state is not reachable from the states of the state repetition loop (step 545, "NO" branch), UMC module 500 determines whether all states have been tested for unbounded safety checks (decision step 555), and for the case in which all states have been checked (step 555, "YES" branch), UMC module 500 ends. For the case in which UMC module 500 determines that some states remain to be tested for unbounded safety (step 555, "NO" branch), UMC module 500 returns to step 525 and performs an unbounded safety check on an untested state, and proceeds as described above.

Determining that a prefix state is reachable by the state repetition state (step 545, "YES" branch), UMC module 500 reports a concrete counterexample of a liveness property of the trace (step 550), and UMC module 500 ends.

In the cases in which UMC module 500 does not determine an unbounded safety fail after checking for all the counter increment states, and a state repetition is still not determined in the trace suffix loop, then the steps are repeated for the rest of the states in the trace.

Figure 6:
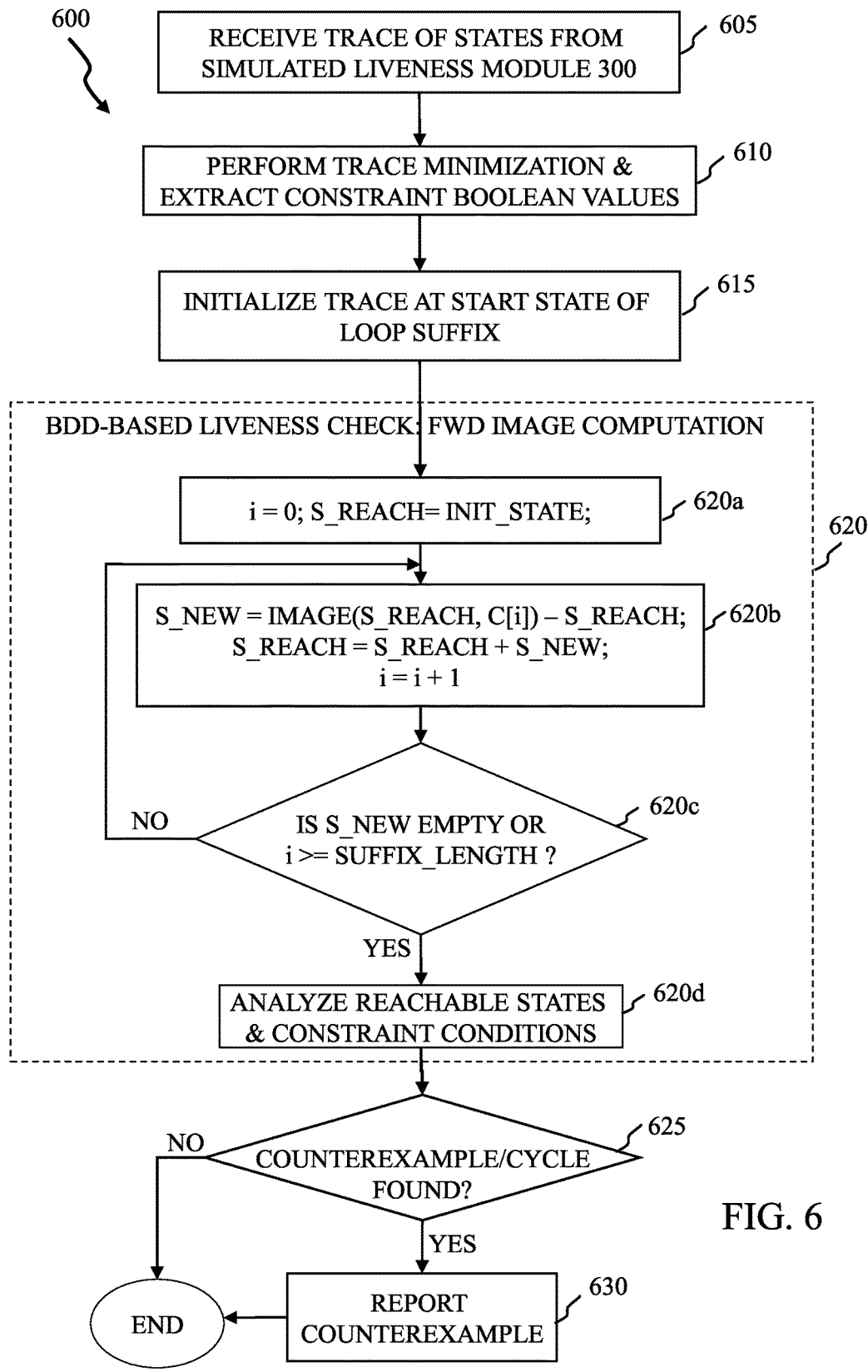
FIG. 6 depicts a flowchart operational steps of a concretization of a binary decision diagram (BDD) checking module, in accordance with an embodiment of the present invention.

FIG. 6 depicts a flowchart of operational steps of a concretization of a binary decision diagram (BDD) checking module 600, in accordance with an embodiment of the present invention.

Some embodiments of the present invention recognize that two challenges in using UMC module 500 are selecting the right start time interval and selecting the right end interval, respectively corresponding to a starting state and ending state for loop detection in bounded model checking. UMC module 500 partially alleviates the selection of an end time interval corresponding to an end state for loop detection by using an unbounded algorithm to find any possible end time. There remains many options for a start time interval, corresponding to a starting state for loop detection, and each time an unsuccessful time interval is chosen, computational resources are wasted. Binary decision diagram (BDD) checking module 600 performs liveness property verification using binary decision diagram-based liveness checking, and is intended to alleviate poor starting time interval selections. BDDs are used in model checking techniques of formal verification of hardware and some software system component designs. In BDD analysis, Boolean functions are represented as a directed graph that include connected decision nodes and terminal nodes BDD checking module 600 receives a state trace from simulation module 300 (step 605). The received trace failed the unbounded safety verification and concretization simulation of simulation module 300. The trace is further processed by BDD checking module 600 performing trace minimization and extracting Boolean values (step 610). A trace minimization is performed on the received trace from the constructed safety problem of simulation module 300. With respect to the time intervals of the trace, Boolean values of state variables and inputs are extracted from the trace constraints, and are used to complete the loop of the trace suffix. The extraction of trace constraints is performed to determine whether concrete loop conditions can be identified in the suffix part of the bounded liveness failure. By constraining the reachable state space (from BDD-based forward image computations) based on extracting constraints, computational resources to identify a suffix loop are reduced. As such, the extracted constraints are derived only after the bounded liveness counterexample is incrementing its counter, as it traverses the states of the trace suffix. Having extracted Boolean values of constraint variables and inputs, BDD checking module 600 initializes the trace at the starting state of the trace suffix (step 615). The starting state of the trace suffix is initialized to enable performance of BDD-based liveness verification (checking) within a bounded time frame.

In various embodiments, BDD-based liveness checking includes two steps. In the first step, BDD checking module 600 performs a reachable state set computation. Determining the reachability of a state set from a given state involves image computation, in which identification of the set of states that are reachable from a given state, within a given time interval step, is performed. In some embodiments of the present invention, the reachable state set may be computed by iterative application of image computations, in which the image of a set of states contains all states that can be reached from the selected state of a trace by executing one step of the trace model, which is usually a next time interval of a bounded timeframe.

In the second step of BDD-based liveness checking, BDD checking module 600 analyzes the reachable states for fairness-preserving state repetitions; however, embodiments of the present invention limit the scope of the analysis of the BDD-based liveness checking to adhere to the suffix part of the bounded liveness failure having extracted constraints to reduce the computational resources. BDD checking module 600 performs BDD-based liveness checking (step 620). In this embodiment, operations of BDD-based liveness checking are represented and discussed as pseudo code, depicted in sub-steps 620a-620d.

BDD checking module 600 sets the reachable states, S_REACH, to the initial state of the trace suffix, INIT_STATE, and sets a time interval counter, "i", to zero (step 620a). BDD checking module 600 iterates through a set of states for each time interval of the minimized trace suffice and will determine a set of reachable states.

BDD checking module 600 performs a forward image function of a state and determines the new reachable states (step 620b). BDD checking module 600 includes constraints of fairness and liveness for the current state (C[i]) in determining new states, S_NEW, reachable from the current state. Forward image computations, IMAGE(S_REACH, C[i]) determine the next (reachable) states from a set of states, for a given time interval. Removing previously determined reachable states from the forward image computations results in new reachable states, S_NEW, and the aggregate of reachable states combines the previous reachable states and the new reachable states, S_REACH=S_REACH+S_NEW. Having determined the reachable states of a set of states for a time interval, BDD checking module 600 increments to a next state time interval, i=i+1.

BDD checking module 600 determines whether new reachable states are identified, IS S_NEW EMPTY, or if the increment counter of time intervals has reached the end of the suffix, i>=SUFFIX_LENGTH (step 620c). If BDD checking module 600 finds no new reachable states, or reaches the end of the trace suffix, then all reachable states have been determined for the suffix. If new reachable states are found, (step 620*c*, "NO" branch), BDD checking module 600 returns to step 620*b* and performs forward image computations to determine the reachable states from the set of states for the next time interval of the trace.

If no new reachable states are found or the suffix states of the trace have been traversed (step 620*c*, "YES" branch), BDD checking module 600 analyzes the reachable states and their associated constraint conditions (step 620*d*). Within the reachable states, BDD checking module 600 analyzes reachable states to determine whether a reachable state leads back to a state already reached (loop), which confirms that a cycle or state repetition exists. Confirming a state repetition exists, BDD checking module 600 determines whether a path of the state repetition loop connects to an initial or starting state, and confirming a connection to an initial state, BDD checking module 600 analyzes the assertion condition of fairness constraints and liveness constraints through the state repetition cycle.

By analyzing the reachable states, BDD checking module 600 determines whether a counterexample is found (decision step 625), and having determined that no counterexample is found (step 625, "NO" branch), BDD checking module 600 ends. In the case in which a counterexample is found by analyzing the reachable states, confirming a state repetition and connection to an initial state of the trace, and determining that fairness constraints are preserved in state repetitions, BDD checking module 600 determines that a counterexample is found (step 625, "YES" branch), and reports a concretized counterexample (step 630). Having reported a discovered concrete counterexample, BDD checking module 600 ends.

In some embodiments of the present invention, the steps comprising the BDD-based liveness checking can be performed either after the entire set of states reached within the duration of the suffix are enumerated, or incrementally at intermediate intervals. In other embodiments of the present invention, the BDD-based analysis performed by BDD checking module 600 can either can be performed using forward image computations starting with the first state of the loop suffix state, and proceeding to the last state of the loop (or) backward pre-image computations with the last state of the loop suffix, and proceeding to the first state of the loop suffix. Embodiments of the present invention include seeding the BDD-based liveness checking process from a state of the minimized trace, and restricting the reachable state computation to those satisfying the extracted constraints.

Some embodiments of the present invention make use of one of the modules of liveness program 130 to perform a verification of a concrete counterexample of a liveness property. Other embodiment may utilize a combination of modules 300, 400, 500, and 600 of liveness program 130.

Figure 7:
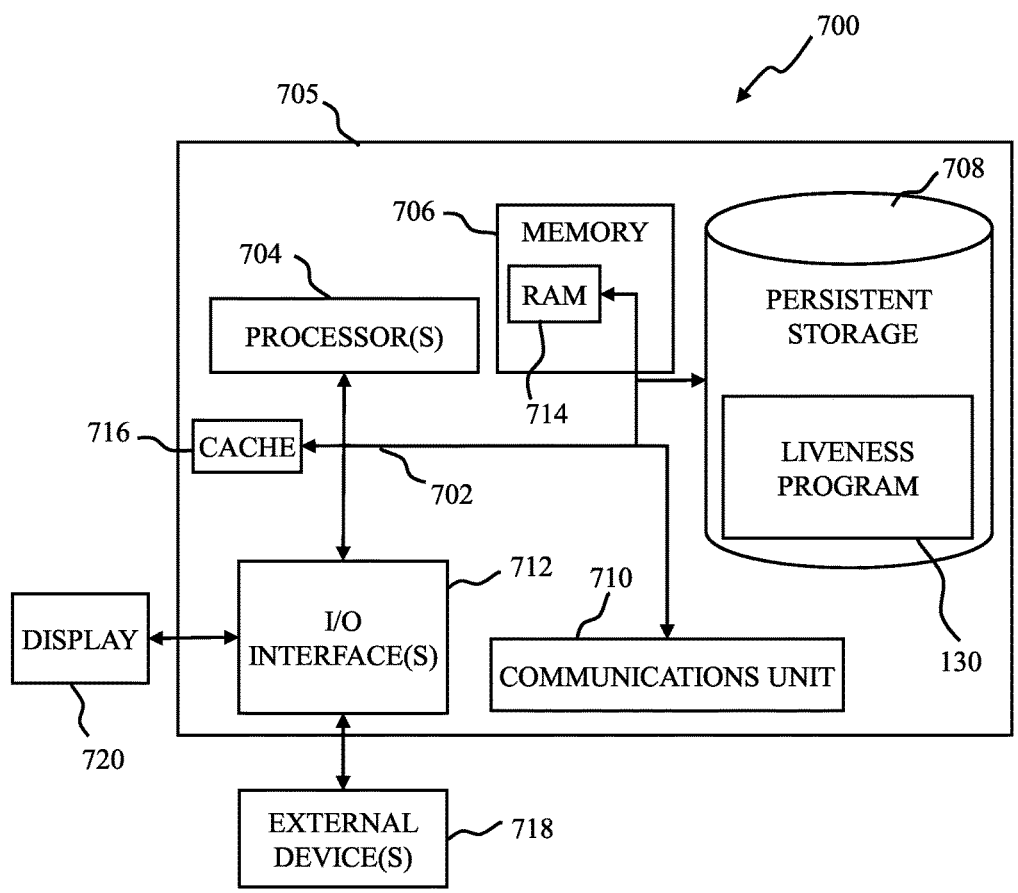
FIG. 7 depicts a block diagram of components of a computing device capable of operating the modules of a liveness program, in accordance with an embodiment of the present invention.

FIG. 7 depicts a block diagram of components of computing system 700, including computing device 705, capable of executing liveness program 130, simulation module 300, BMC module 400, UMC module 500, and BDD checking module 600, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 705 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Liveness program 130, simulation module 300, BMC module 400, U are stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of distributed verification processing environment 100. In these examples, communications unit 710 includes one or more network interface cards. Communications unit 710 may provide communications through the use of either or both physical and wireless communications links. Liveness program 130, and simulation module 300, BMC module 400, UMC module 500, and BDD checking module 600, may be downloaded to persistent storage 708 through communications unit 710.

I/O interface(s) 712 allows for input and output of data with other devices that may be connected to computing device 110 and system component 120. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., liveness program 130, and simulation module 300, BMC module 400, UMC module 500, and BDD checking module 600 program 300 and program 400, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for mapping a bounded liveness failure to a concrete counterexample of a liveness property of a system component, the method comprising:
receiving, by one or more processors, a trace of a bounded liveness failure of a system component, a set of fairness constraints and continuous liveness assertion conditions corresponding to the trace;
generating, by one or more processors, randomized values for one or more unassigned input values of one or more registers of the trace and for unassigned register values of the one or more registers of the trace;
simulating, by one or more processors, traversal of each state of a sequence of states of the trace;
determining, by one or more processors, whether a repetition of a state of the sequence of states of the trace is produced by traversing the sequence of states of the trace; and
responsive to determining that traversing the sequence of states of the trace does result in a repetition of a state of the sequence of states of the trace, and determining that the set of fairness constraints are asserted within the sequence of states leading to the repetition of a state of the sequence of states, and that the continuous liveness assertion conditions are maintained throughout the sequence of states leading to the repetition of the state of the sequence of states, reporting, by one or more processors, a concrete counterexample of a liveness property of the system component.

2. The method of claim 1, wherein responsive to determining that traversing the sequence of states of the trace does not result in a repetition of a state of the sequence of states of the trace, the method further comprising:
performing a trace minimization, by one or more processors, wherein one or more unassigned input values of the one or more registers of the trace that are independent of determining a bounded liveness failure are removed;
analyzing incrementally, by one or more processors, the one or more registers of the trace of the bounded liveness failure, to match a register to a time interval having a start time corresponding to a first state and an end time corresponding to a second state, within a bounded timeframe of the trace; and
responsive to the fairness constraints being made and the continuous liveness assertion conditions being maintained throughout a loop of a sequence of states that includes a repetition of a state of the sequence of states of the trace, determining, by one or more processors, a concrete counterexample of a liveness property of the system component.

3. The method of claim 2, wherein analyzing incrementally, the one or more registers of the trace of the bounded liveness failure, includes checking simultaneously for an equality of the one or more registers at the start time and the end time of the time interval.

4. The method of claim 2, wherein one or more registers are matched between a start time and an end time of a time interval within the bounded timeframe of the trace, based on a priority of concreteness of the states, in which a priority of the concreteness is determined by the values of the one or more registers, and on which high priority unmatched registers of a state are matched incrementally.

5. The method of claim 1, further comprising:
one or more processors performing a trace minimization, wherein at least one input value that is assigned of the one or more registers for a state of the sequence of states, which are independent of the bounded liveness failure, is removed;
one or more processors sorting the sequence of states based on a concreteness of register values of each state, wherein the concreteness of register values is determined by a quantity of Boolean values;
one or more processors determining candidate time steps as a start timeframe and an end timeframe of a state of the trace minimization, exhibiting compatible values of the one or more registers of the state for each increment of candidate time steps;
one or more processors performing an unbounded safety query check, in which a reachability of a prefix state of the sequence of states of the trace minimization, responsive to a determination of a state repetition loop, while fairness assertions and liveness assertion conditions are met;
responsive to the determination of a failed unbounded safety query check, one or more processors determining whether prefix states of the trace can be reached from a state indicating a repetition; and
responsive to the determination that the prefix states of the trace can be reached from the state indicating a repetition, one or more processors reporting a concrete counterexample of a liveness property.

6. The method of claim 1, further comprising:
one or more processors performing a trace minimization, wherein an input value of the one or more registers that are independent of the bounded liveness failure is removed, resulting in a minimized trace;
one or more processors performing an extraction of input constraints with respect to each time step of a bounded timeframe of the minimized trace;
one or more processors performing a binary decision diagram-based liveness verification within a bounded timeframe of the minimized trace, by completing a loop of states of the sequence of states of the minimized trace which includes a repeated state, wherein reachable states from the repeated state are analyzed for fairness constraints and continuous liveness assertion conditions throughout the loop of states, beginning at a starting state of the loop of states, and the reachable states are based on suffix information resulting from the input constraints that are extracted from the repeated state; and
responsive to determining a reachable state space is constrained at every time step of the bounded timeframe of the minimized trace, by the input constraints, one or more processors reporting a concrete counterexample of a liveness property.

7. The method of claim 1, wherein determining whether a repetition of a state of the sequence of states of the trace is produced by traversing the sequence of states of the trace, further comprises:
generating, by one or more processors, while traversing the sequence of states of the trace, a hash of each state of the sequence of states of the trace, wherein the hash of each state is stored in a hash table as each state of the sequence of states is simulated;

comparing the hash of a current state of the sequence of states of the trace to each hash stored in the has table; and in response to determining a match of the hash of the current state of the sequence of states of the trace to a hash stored in the hash table, identifying a repeated state of the sequence of states of the trace.

8. The method of claim 1, wherein a bounded timeframe of the trace is predetermined in which a failure of a bounded safety property check of the trace is produced, and includes a sequence of states of the trace in which a state comprises a set of values applied to all of one or more registers of the trace and inputs to the one or more registers of the trace, and each state of the sequence of states corresponds to a time interval within the bounded timeframe.

9. The method of claim 1, wherein a hash table in which is stored a hash corresponding to the values of the registers and inputs of a state, for each state of the trace that is traversed, is cleared in response to an absence of the liveness assertion conditions continuously being applied during traversing of the sequence of states of the trace.

\* \* \* \* \*